United States Patent
Yang et al.

(10) Patent No.: US 10,851,742 B2
(45) Date of Patent: Dec. 1, 2020

(54) INTAKE SYSTEM FOR VEHICLE

(71) Applicants: HYUNDAI MOTOR COMPANY, Seoul (KR); KIA MOTORS CORPORATION, Seoul (KR)

(72) Inventors: Il Suk Yang, Hwaseong-si (KR); Sangwook Kweon, Incheon (KR); Soo Hyung Woo, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/536,612

(22) Filed: Aug. 9, 2019

(65) Prior Publication Data
US 2020/0141369 A1    May 7, 2020

(30) Foreign Application Priority Data
Nov. 2, 2018   (KR) .................. 10-2018-0133830

(51) Int. Cl.
*F02M 26/19*   (2016.01)
*F02M 35/10*   (2006.01)
*F02M 26/41*   (2016.01)
*F02M 26/20*   (2016.01)

(52) U.S. Cl.
CPC ...... *F02M 35/10222* (2013.01); *F02M 26/19* (2016.02); *F02M 26/20* (2016.02); *F02M 26/41* (2016.02); *F02M 35/10072* (2013.01)

(58) Field of Classification Search
CPC ........ F02M 26/20; F02M 26/41; F02M 26/19; F02M 26/17; F02M 35/10222; F02M 35/10072
See application file for complete search history.

(56) References Cited

U.S. PATENT DOCUMENTS

| | | | | |
|---|---|---|---|---|
| 5,490,488 | A * | 2/1996 | Aversa ................ | F02B 75/22 123/184.31 |
| 5,657,727 | A * | 8/1997 | Uchida ................ | F02B 27/006 123/184.34 |
| 10,337,469 | B1 * | 7/2019 | Wicks ............... | F02M 35/10222 |
| 2003/0230291 | A1 * | 12/2003 | Ko ................... | F02M 35/10045 123/572 |
| 2013/0118433 | A1 * | 5/2013 | Tochizawa ........ | F02M 35/10222 123/184.21 |

(Continued)

*Primary Examiner* — Thomas N Moulis
(74) *Attorney, Agent, or Firm* — Morgan, Lewis & Bockius LLP

(57) ABSTRACT

An intake system of a vehicle includes: an intake manifold having a plurality of runners for supplying intake gas to a multiple-cylinder engine; a surge tank cover coupled to the intake manifold to define a surge tank communicating with the plurality of runners via the intake manifold; an intake air inlet formed on the intake manifold as a passage through which intake air flows into the surge tank; an intake outlet formed on the intake manifold as a passage through which intake air sequentially passing through the intake air inlet, the surge tank, and the plurality of runners, and is discharged to the engine as the intake gas; a gas inlet which is a passage formed on the intake manifold and selectively receiving recirculation exhaust gas; and a gas chamber formed on the intake manifold so that the recirculation exhaust gas flows in through the gas inlet.

10 Claims, 3 Drawing Sheets

(56) References Cited

U.S. PATENT DOCUMENTS

| | | | |
|---|---|---|---|
| 2014/0014056 A1* | 1/2014 | Sato | F02M 26/41 |
| | | | 123/184.47 |
| 2018/0283325 A1* | 10/2018 | Nagata | F02M 35/112 |
| 2019/0136805 A1* | 5/2019 | Tanaka | F02M 35/10255 |
| 2019/0170095 A1* | 6/2019 | Yasue | F02M 26/32 |
| 2019/0219012 A1* | 7/2019 | Wicks | F02M 35/10222 |

* cited by examiner

INTAKE SYSTEM FOR VEHICLE

CROSS-REFERENCE TO RELATED APPLICATION

This application claims priority to and the benefit of Korean Patent Application No. 10-2018-0133830 filed in the Korean Intellectual Property Office on Nov. 2, 2018, the entire contents of which are incorporated herein by reference.

TECHNICAL FIELD

The present disclosure relates to an intake system of a vehicle, and more particularly, to an intake system of a vehicle for improving fuel efficiency.

BACKGROUND

In general, an internal combustion engine has features in that a gas mixture is combusted in a combustion chamber, and is operated by energy generated by combustion heat.

An internal combustion engine includes a multiple-cylinder engine equipped with a plurality of cylinders to increase the output of the engine and to reduce noise and vibration.

This multiple-cylinder engine is equipped with an intake manifold, which is a passage for guiding intake from an intake passage to each cylinder, and an exhaust manifold, which is a passage for collecting exhaust gas exhausted from each cylinder to be transmitted to an exhaust passage.

On the other hand, an exhaust gas recirculation (EGR) device is installed in the vehicle to reduce noxious exhaust gas and improve fuel efficiency of the engine.

The exhaust gas recirculation device functions to reduce the amount of oxygen in a mixture, reduce the exhaust amount of the exhaust gas, and reduce harmful materials in the exhaust gas by circulating a part of the exhaust gas exhausted from the engine to the intake.

When the exhaust gas recirculated by the exhaust gas recirculation device flows into the rear end of a throttle valve, the temperature decreases while the exhaust gas is mixed with the intake gas, and condensed water in which moisture in the exhaust gas is condensed may be generated. If the condensed water flows into the combustion chamber of the engine, the performance of the engine may be deteriorated and failures may occur. This problem may be the same even in the case of flowing the recirculated exhaust gas into a surge tank communicating with each runner of the intake manifold.

Recently, to solve this problem, an intake system in which the recirculation exhaust gas flows into each runner of the intake manifold and is supplied to each cylinder has been applied.

However, it is not easy to uniformly distribute the recirculation exhaust gas to each cylinder through each runner of the intake manifold, and a non-uniform supply of the recirculation exhaust gas for each cylinder may cause fuel efficiency deterioration. On the other hand, if a pipeline for uniformly distributing the recirculation exhaust gas to each runner of the intake manifold becomes complicated, the volume of a protruded portion of the intake manifold can be widened while simultaneously increasing resistance of the pipeline. Thus, the pipeline resistance may deteriorate the supply efficiency of the recirculation exhaust gas, generate heat by the resistance, and the spatial utility may be deteriorated by the wider volume of the intake manifold.

The above information disclosed in this Background section is only for enhancement of understanding of the background of the disclosure and therefore it may contain information that does not form the prior art that is already known in this country to a person of ordinary skill in the art.

SUMMARY

The present disclosure provides an intake system of a vehicle having a simple pipeline while uniformly distributing a recirculation exhaust gas to each cylinder of an engine.

An intake system of a vehicle according to an exemplary embodiment of the present disclosure may include: an intake manifold having a plurality of runners for supplying intake gas to a multiple-cylinder engine; a surge tank cover coupled to the intake manifold to define a surge tank communicating with the plurality of runners via the intake manifold; an intake air inlet formed on the intake manifold as a passage through which intake air flows into the surge tank; an intake outlet formed on the intake manifold as a passage through which the intake air sequentially passing through the intake air inlet, the surge tank, and the plurality of runners, and is discharged to the engine as the intake gas; a gas inlet which is a passage formed on the intake manifold and selectively receiving recirculation exhaust gas; a gas chamber formed on the intake manifold so that the recirculation exhaust gas flows in through the gas inlet; a plurality of gas distribution passages to communicate with the gas chamber and formed on the intake manifold; and a gas distribution hole on the intake manifold as a passage through which the recirculation exhaust gas sequentially passing through the gas inlet, the gas chamber, and the plurality of gas distribution passages flows into the plurality of runners, respectively.

The runner may have one part formed on the intake manifold and another part formed on the surge tank cover, and an entire pipeline may be completed by the combination of the surge tank cover and the intake manifold.

The surge tank may communicate with the runner of the surge tank cover, and the gas chamber may communicate with the runner of the intake manifold through the gas distribution hole.

The gas distribution hole may be drilled so that the flow direction of the recirculation exhaust gas does not rise upward.

The gas distribution passage may be formed as a part of the gas chamber.

The gas chamber may be provided to ensure air-tightness on a part except for the gas inlet and the gas distribution hole.

The intake system of the vehicle according to an exemplary embodiment of the present disclosure may further include a gas chamber cover functioning to ensure air-tightness of the gas chamber on a part except for the gas inlet and the gas distribution hole by closing one opened surface of the gas chamber processed to open one surface on the intake manifold.

A volume of each section of which the gas chamber equally divided along a direction away from the gas inlet so that gas distribution passage is disposed one by one may become smaller away from the gas inlet.

The intake air flowing in through the intake air inlet may be supplied to an engine as an intake gas by sequentially passing through the surge tank, the runner, and the intake outlet.

The recirculation exhaust gas selectively flowing in through the gas inlet may be supplied to an engine as an intake gas by sequentially passing through the gas chamber, the gas distribution passage, the gas distribution hole, the runner, and the intake outlet and is mixed with the intake air in the runner.

DETAILED DESCRIPTION OF THE EMBODIMENTS

An exemplary embodiment of the present disclosure will hereinafter be described in detail with reference to the accompanying drawings.

Figure 1:
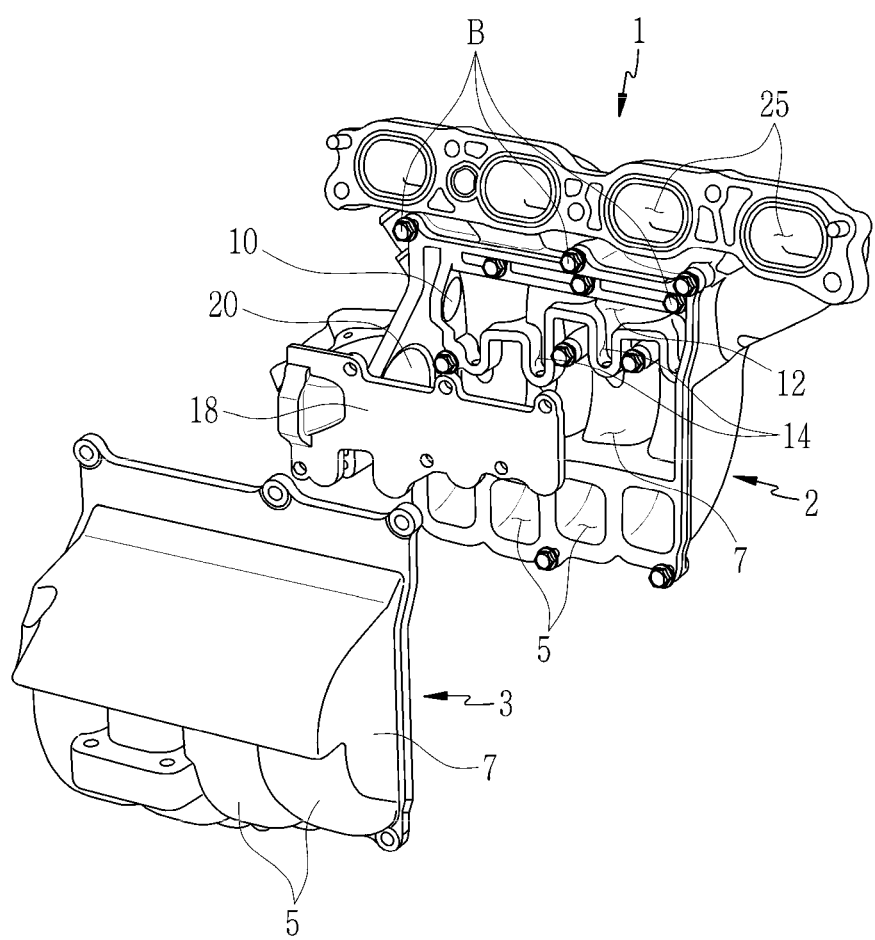
FIG. 1 is an exploded view showing a configuration of an intake system of a vehicle according to an exemplary embodiment of the present disclosure.
Figure 2:
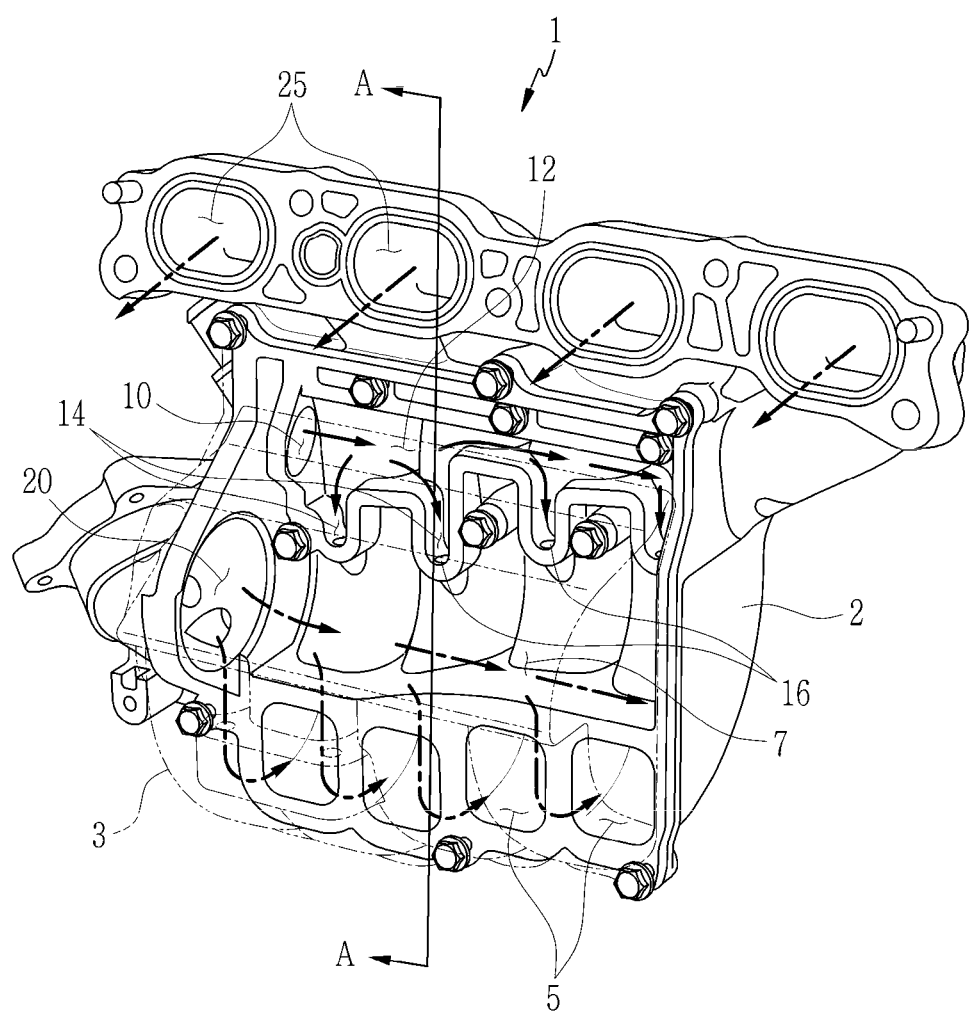
FIG. 2 is a diagram showing a configuration of an intake system of a vehicle according to an exemplary embodiment of the present disclosure.
Figure 3:
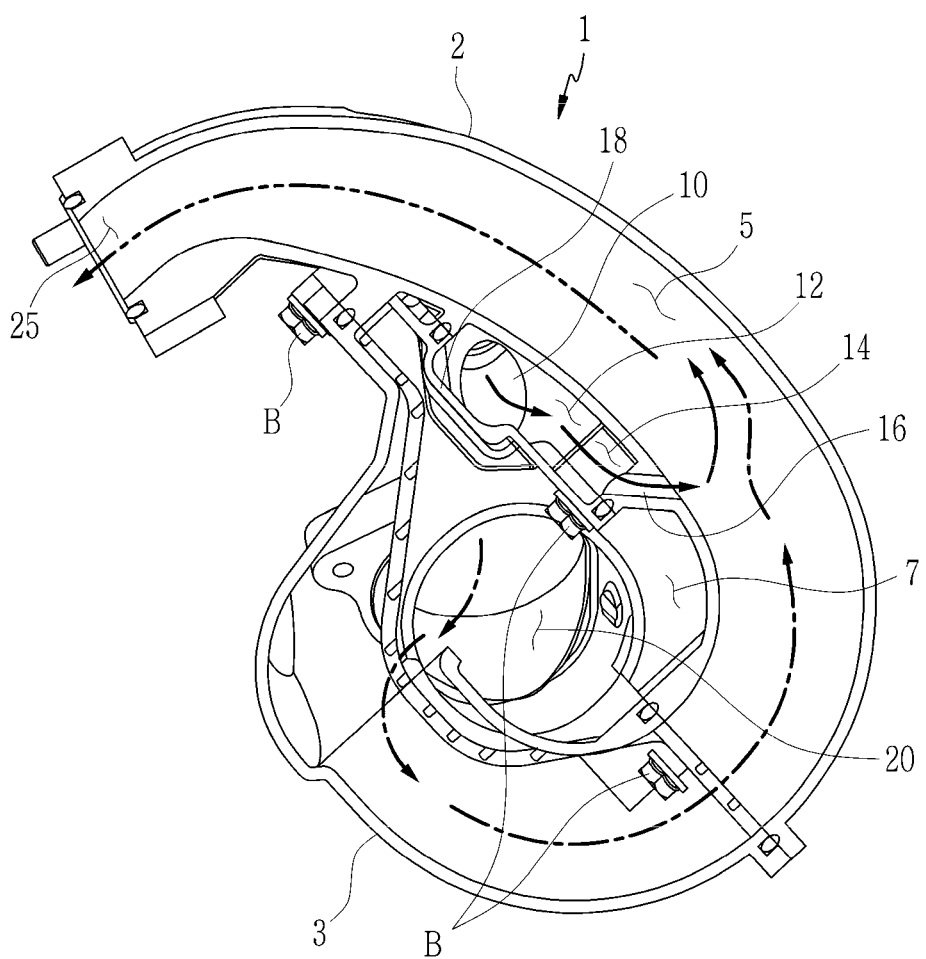
FIG. 3 is a cross-sectional view taken along a line A-A of FIG. 2.

FIG. 1 is an exploded view showing a configuration of an intake system of a vehicle according to an exemplary embodiment of the present disclosure, FIG. 2 is a diagram showing a configuration of an intake system of a vehicle according to an exemplary embodiment of the present disclosure, and FIG. 3 is a cross-sectional view taken along a line A-A of FIG. 2.

As shown in FIG. 1 to FIG. 3, an intake system 1 of a vehicle according to an exemplary embodiment of the present disclosure includes an intake manifold 2, a surge tank cover 3, an intake air inlet 20, an intake outlet 25, a gas inlet 10, a gas chamber 12, a gas distribution passage 14, a gas distribution hole 16, and a gas chamber cover 18.

The intake manifold 2 is a passage receiving intake air depending on an opening of a throttle valve (not shown) through an intake passage and guiding the intake air to be supplied to each cylinder (not shown) of a multiple-cylinder engine as an intake gas, and forms a runner 5 of a same number as a plurality of cylinders. A basic configuration and function of the intake manifold 2 is obvious to a person skilled in the art (hereinafter referred to as ordinarily skilled in the art), and the detailed description thereof is omitted.

The surge tank cover 3 may be combined with the intake manifold 2, thereby forming a flow path of the intake air. Here, the runner 5 includes one part formed on the intake manifold 2 and another part formed on the surge tank cover 3, and an entire pipeline may be completed by the combination of the surge tank cover 3 and the intake manifold 2. On the other hand, the surge tank cover 3 may be designed to vary the flow path of the intake air delivered to the intake manifold 2 to at least two or more, and varying the flow path of the intake air may be control for selectively varying the flow path of the intake air to be longer or shorter depending on a driving state of the engine or driving circumstances of the vehicle, or for rapidly or slowly rotating the intake air. However, the description of the configuration of the surge tank cover 3, which implements the varying of the intake air flow path, is omitted in this specification.

The intake air inlet 20 is formed in the intake manifold 2 as a passage through which the intake air flows into the intake manifold 2. At this time, the intake air flow to the intake manifold 2 through the intake air inlet 20 is temporarily stored in a surge tank 7 surrounded by the intake manifold 2 and the surge tank cover 3. That is, the intake air inlet 20 communicates the outside of the intake manifold 2 with the surge tank 7, and the surge tank 7 communicates with the runner 5 formed in the surge tank cover 3. Here, the basic structure and function of the surge tank 7 is obvious to a person of ordinary skill in the art, so the detailed description thereof is omitted.

The intake outlet 25 is formed in the intake manifold 2, and is the passage through which the intake air flows into the engine as an intake via the intake manifold 2. That is, the intake outlet 25 is at the rearmost end of the runner 5 based on the direction in which the intake air flows.

The gas inlet 10 is formed in the intake manifold 2, and is a passage through which the exhaust gas (recirculation exhaust gas) selectively recirculated by the exhaust gas recirculation device (not shown) flows into the intake manifold 2 as the intake gas.

The gas chamber 12 is formed in the intake manifold 2, and is a space in which the recirculation exhaust gas flowing into the intake manifold 2 through the gas inlet 10 is temporarily stored. That is, the gas inlet 10 communicates the outside of the intake manifold 2 with the gas chamber 12.

The gas distribution passage 14 is formed in the intake manifold 2 as a pipeline communicating with the gas chamber 12. The gas distribution passage 14 may be formed as a part of the gas chamber 12. Further, gas distribution passages 14 are provided with the same number as the runners 5 to respectively communicate with the runners 5, which are formed with the same number as the plurality of cylinders. Here, the gas distribution passage 14 may be formed according to the design of a person of ordinary skill in the art by considering the distance from the gas inlet 10 such that the recirculation exhaust gas is uniformly distributed to each runner 5. For example, assuming that the gas chamber 12 with which the gas distribution passage 14 communicates is divided into sections of a uniform width along a direction away from the gas inlet 10, that is, in a case that the part where four gas distribution passages 14 are respectively formed to four cylinders as one section is divided into four sections along a direction away from the gas inlet 10, a volume including the gas chamber 12 and the gas distribution passage 14 decreases away from the gas inlet 10 in one section. In order to implement this volume distribution, the gas distribution passage 14 may be designed to be shortened away from the gas inlet 10, but is not limited thereto. On the other hand, a uniform distribution of the recirculation exhaust gas through the gas distribution passage 14 may be easily realized by providing the gas chamber 12, which is the space in which the recirculation exhaust gas flowing into the intake manifold 2 is temporarily stored.

The gas distribution hole 16 is formed in the intake manifold 2 as a passage through which the recirculation exhaust gas flows into the runner 5 via the gas distribution passage 14. That is, the gas distribution hole 16 is formed to communicate the gas distribution passage 14 with the runner 5 formed in the intake manifold 2. Here, the direction in which the gas distribution hole 16 is pierced so as to communicate the gas distribution passage 14 and the runner 5 is the direction in which the flow direction of the recirculation exhaust gas does not rise upward in the state that the engine is mounted on the vehicle. This is to ensure that the recirculation exhaust gas flows horizontally or downward to ensure efficient flow performance.

The gas chamber cover 18 is provided to secure a gas tightness of the gas chamber 12 and the gas distribution passage 14 at the part except at the gas inlet 10 and the gas distribution hole 16. That is, the gas chamber cover 18 is connected to the intake manifold 2 between the intake manifold 2 and the surge tank cover 3, and functions to partition the surge tank 7 and the gas chamber 12. At this time, as the gas chamber cover 18 is bolted to maximize utility of bolts B for joining the intake manifold 2 and the surge tank cover 3, the number of additional bolts (B) required for bolting the gas chamber cover 18 may be minimized. Here, the gas chamber 12 is processed by considering convenience of manufacturing so that one side is opened at the intake manifold 2 and the gas chamber cover 18 only closes the opened side of the gas chamber 12, but it is not limited thereto, and according to the design of a person of ordinary skill in the art, other methods may be chosen to ensure the air-tightness of the gas chamber 12 and the gas distribution passage 14 at the part except for the gas inlet 10 and the gas distribution hole 16.

Hereinafter, the flow of the intake is described with reference to FIG. 2 and FIG. 3.

In FIG. 2 and FIG. 3, the flow of the intake air is shown as a one-dot chain line, the flow of the recirculation exhaust gas is shown as a solid line, and the flow of the mixture is shown as a two-dot chain line. Here, the mixture is a mixture of intake air and recirculation exhaust gas.

The intake air received in accordance with the opening of the throttle valve flows into the surge tank 7 via the intake air inlet 20 and the intake air temporarily stored in the surge tank 7 flows into the runner 5 of the surge tank cover 3. The entire pipeline of the runner 5 combined with the runner 5 of the surge tank cover 3 and the runner 5 of the intake manifold 2 is completed by the combination of the surge tank cover 3 and the intake manifold 2, and the intake air of the surge tank cover 3 flows out to the intake outlet 25 through the runner 5 of the intake manifold 2. The exhaust gas selectively recirculated by the exhaust gas recirculation device flows into the gas chamber 12 through the gas inlet 10, and the recirculation exhaust gas temporarily stored in the gas chamber 12 passes through the gas distribution passage 14 and flows into the runner 5 of the intake manifold 2 through the gas distribution hole 16. At this time, the recirculation exhaust gas having flowed into the runner 5 of the intake manifold 2 is mixed with the intake air passing through the runner 5 of the intake manifold 2, and the mixture is discharged to the intake outlet 25. In other words, the intake air is supplied to the engine as the intake gas sequentially passes through the intake air inlet 20, the surge tank 7, the runner 5, and the intake outlet 25, the exhaust gas is supplied to the engine as the intake gas by sequentially passing though the gas inlet 10, the gas chamber 12, the gas distribution passage 14, the gas distribution hole 16, the runner 5 of the intake manifold 2, and the intake outlet 25 when being selectively supplied to the intake manifold 2 by the exhaust gas recirculation device, and the intake air and the recirculation exhaust gas are mixed in the runner 5 of the intake manifold 2 and discharged through the intake outlet 25.

As above-described, according to an exemplary embodiment of the present disclosure, corrosion of the intake manifold 2 and malfunctions of electronic devices such as various sensors may be prevented by minimizing the amount of condensed water flowing into the surge tank 7, and ultimately, performance of the engine may be assured by minimizing the amount of condensed water flowing into the combustion chamber of the engine. In addition, the recirculation exhaust gas may be uniformly distributed to each runner 5 of the intake manifold 2, thereby improving fuel efficiency. Furthermore, as the pipeline for uniformly distributing the recirculation exhaust gas to each runner 5 of the intake manifold 2 is simplified, the pipeline resistance is minimized, thereby ensuring supply efficiency of the recirculation exhaust gas, and the volume occupied by the protruded part of the intake manifold 2 is reduced, thereby improving spatial utility.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. An intake system of a vehicle, comprising:
   an intake manifold having a plurality of runners for supplying intake gas to a multiple-cylinder engine;
   a surge tank cover coupled to the intake manifold to define a surge tank communicating with the plurality of runners via the intake manifold;
   an intake air inlet formed on the intake manifold as a passage through which intake air flows into the surge tank;
   an intake outlet formed on the intake manifold as a passage through which the intake air sequentially passes through the intake air inlet, the surge tank, and the runner, and is discharged to the engine as the intake gas;
   a gas inlet which is a passage formed on the intake manifold and selectively receives recirculation exhaust gas;
   a gas chamber formed on the intake manifold so that the recirculation exhaust gas flows in through the gas inlet;
   a plurality of gas distribution passages on the intake manifold to communicate with the gas chamber; and
   a gas distribution hole on the intake manifold as a passage through which the recirculation exhaust gas sequentially passing through the gas inlet, the gas chamber, and the plurality of gas distribution passages flows into the plurality of the runners, respectively.

2. The intake system of the vehicle of claim 1, wherein each of the plurality of runners has one part on the intake manifold and another part formed on the surge tank cover, so as to define a pipeline for distributing the recirculation exhaust gas to each runner of the intake manifold.

3. The intake system of the vehicle of claim 2, wherein the surge tank communicates with the plurality of runners of the surge tank cover, and the gas chamber communicates with the plurality of runners of the intake manifold through the gas distribution hole.

4. The intake system of the vehicle of claim 3, wherein the gas distribution hole is arranged so that a flow direction of the recirculation exhaust gas does not rise upward.

5. The intake system of the vehicle of claim 1, wherein the plurality of gas distribution passages is a part of the gas chamber.

6. The intake system of the vehicle of claim 5, wherein the gas chamber is on the intake manifold to ensure air-tightness of the gas chamber and the gas distribution passage.

7. The intake system of the vehicle of claim 6, further comprising
   a gas chamber cover configured to ensure air-tightness of the gas chamber by covering one opened surface of the gas chamber.

8. The intake system of the vehicle of claim 6, wherein a volume of each section, of the gas chamber, equally partitioned along a direction away from the gas inlet so that each of the plurality of gas distribution passages is disposed one by one, becomes smaller away from the gas inlet.

9. The intake system of the vehicle of claim 1, wherein the intake air flowing in through the intake air inlet is supplied to the engine as the intake gas by sequentially passing through the surge tank, the plurality of runners, and the intake outlet.

10. The intake system of the vehicle of claim 7, wherein the recirculation exhaust gas selectively flowing in through the gas inlet is supplied to the engine as the intake gas by sequentially passing through the gas chamber, the plurality of gas distribution passages, the gas distribution hole, the plurality of runners, and the intake outlet, and is mixed with the intake air in the plurality of runners.

* * * * *